United States Patent Office 3,471,851
Patented Oct. 7, 1969

3,471,851
DIGITAL-TO-RESOLVER CONVERTER APPARATUS
Donald J. Mactaggart, Montreal, Quebec, Canada, assignor to Sperry Rand Canada Limited, Toronto, Ontario, Canada
Filed May 2, 1966, Ser. No. 546,834
Claims priority, application Canada, Jan. 25, 1966, 950,710
Int. Cl. H04l 3/00; H03k 13/00
U.S. Cl. 340—347
3 Claims

ABSTRACT OF THE DISCLOSURE

A digital-to-resolver converter comprising an A.C. source connected to a pair of networks each including the series combination of an output resistor and a plurality of parallel connected binary weighted resistors each adapted to be switched in and out of its respective network by means of individual solid state switches responsive to respective bits of the $n-2$ least significant bits of the digital signal such that a resistor of a given weight which is switched into one network is simultaneously switched out of the other, the switches being operative to connect the binary weighted resistors directly to ground. Quadrant selection is provided by means of additional switching circuits responsive to the two most significant bits of the digital signal.

---

Figure 1A:
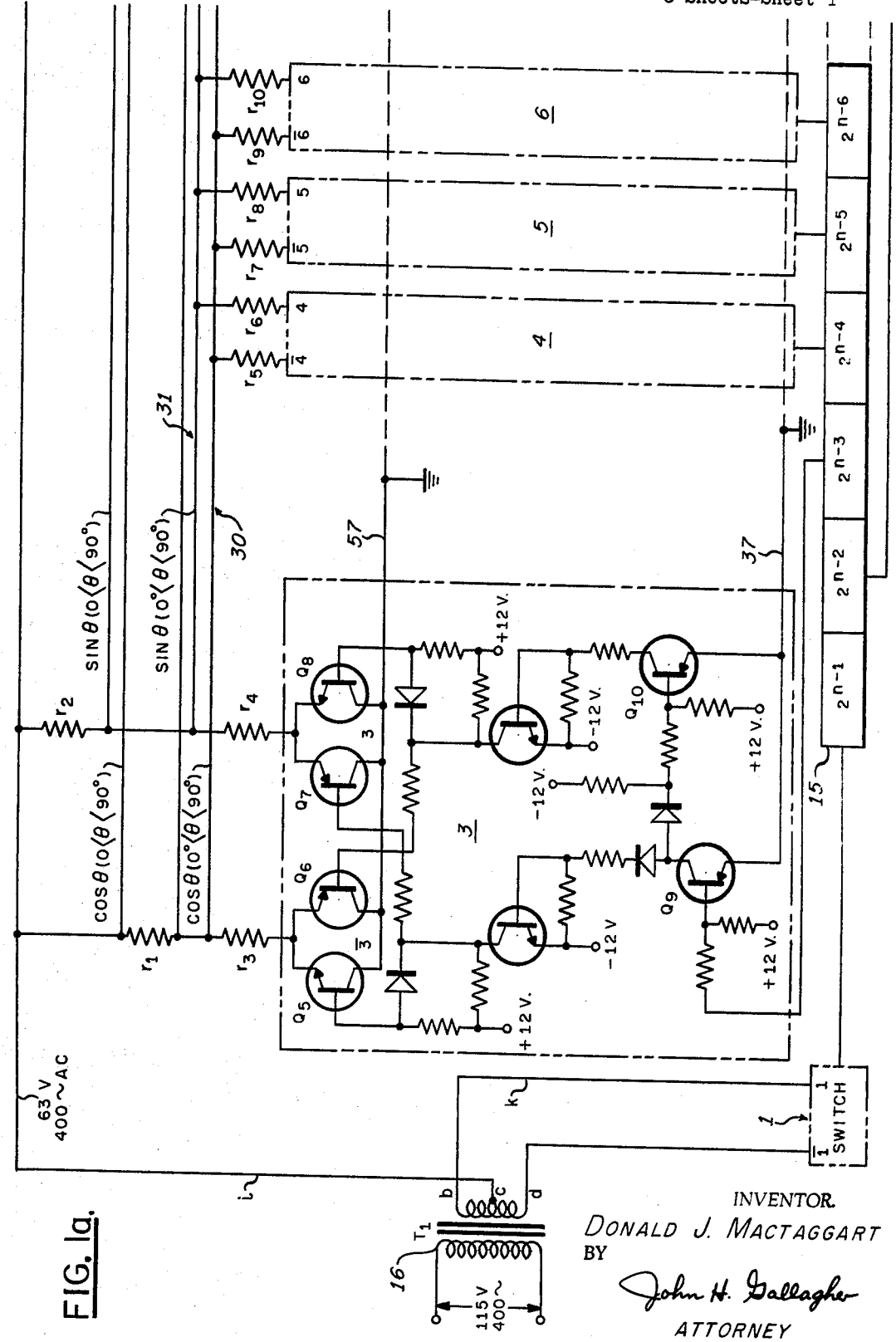

This invention relates to a device for converting input digital data into equivalent analog output data, and in particular the invention relates to an accurate and stably operating device for converting an input digital representation of an angle into two output analog voltages that represent respectively the sine and cosine of the digitally represented angle.

In servo control applications such as in machine tool position control systems, there frequently is need for a device that is responsive to input digital representations of an angle for controlling the angular position of a machine tool shaft. Digital-to-analog converters for performing a function of the type described are disclosed in U.S. Patent 3,134,098 issued to Peter J. Herzl on May 19, 1964, and in U.S. patent application Ser. No. 375,444 now U.S. Patent 3,325,805 filed June 16, 1964 in the name of John D. Dorey, both of which are assigned to applicant's assignee. Conventionally in such devices, input digital representations of a desired angle are converted into voltage approximations of the sine and cosine of the angle. The voltage approximations are coupled through a quadrant switching network to the input stator windings of a resolver whereby one of the stator windings is excited with a voltage that approximately represents the sine of the desired angle and the other stator winding is excited with the voltage that approximately represents the cosine of said angle. The flux resulting from the energization of the stator windings induces a voltage in the rotor winding of the resolver. The rotor winding voltage controls a servomechanism which drives the rotor winding to the angular position at which the rotor voltage is reduced to zero. In the steady-state condition, the angle assumed by the rotor winding is the analog equivalent of the angle represented by the input digital signal.

In the devices described in the above-mentioned patents, the sine and cosine analog voltages are produced by switching weighted resistors into or out of respective series or parallel resistor networks in which the resistance, or its reciprocal the conductance, values of the resistors are related to each other in accordance with powers of two in order to establish a correspondence between the analog output voltages and the digitally coded input signal whose representation is in the binary notation. The weighted resistance values are switched in or out of the resistance networks in response to the bit value of the digital bit to which the respective resistance values are related. In devices of this type the digital signals in the $n-2$ least significant bit positions of the digitally coded input signal control the switching of the resistance, or conductance, values in the networks and the digital signals of the two most significant bit positions control the quadrant switching to account for the changes in the signs and magnitudes of the sine and cosine output signals for angles in the three quadrants other than 0°–90° quadrant. In the above-cited patents two different arrangements of the weighted resistors are shown. In the one, there are two separate series connected resistor networks, each one associated with a respective output resistor across which one of the analog output signals is developed. In the other, a single group of weighted resistors may be switched back and forth between two parallel networks, the networks being series connected to the output resistors.

Although the devices referred to have successfully fulfilled their intended purposes, the speeds at which they can operate inherently are limited by the fact that electromechanical relays are utilized as the switching means. Furthermore, the electromechanical relays have a limited trouble-free lifetime. To overcome the shortcomings of the devices constructed as disclosed in the above-mentioned patents an attempt was made to directly substitute solid state switching circuits for the electromechanical switches. These efforts were unsuccessful, however, because with the circuit configurations disclosed in the patent, the switching transistors were switching between circuit points whose voltage levels were varying with circuit operation and with power supply and component parameter value variations. Furthermore, completely satisfactory switching of the resistance or conductance values was not accomplished because in the transistor switching circuits utilized a sufficiently high ratio of off-to-on impedances could not be achieved. Consequently, accurate sine and cosine analog voltages could not be realized.

These problems are eliminated in the device of the present invention by providing individual parallel networks of weighted resistors in series with each of the two output resistors, and by providing switching circuits that operate in response to the respective digital bit signals to connect and disconnect one or the other of similarly weighted resistors into their respective networks. In connecting the weighted network resistors in their networks, they are always switched directly to ground, a stable reference level. Switching directly to ground also minimizes switching transients and improves the reliability of the device. Acceptable on-off switching operation is achieved by using a transistor circuit configuration which produces maximum off-to-on impedance ratios of the switching transistors.

It therefore is an object of this invention to provide a digital-to-resolver converter device that is accurate and fast in its operation.

Another object of this invention is to provide a digital-to-resolver converter device whose design allows optimum utilization of the advantageous features of solid state circuitry and devices.

Figure 1B:
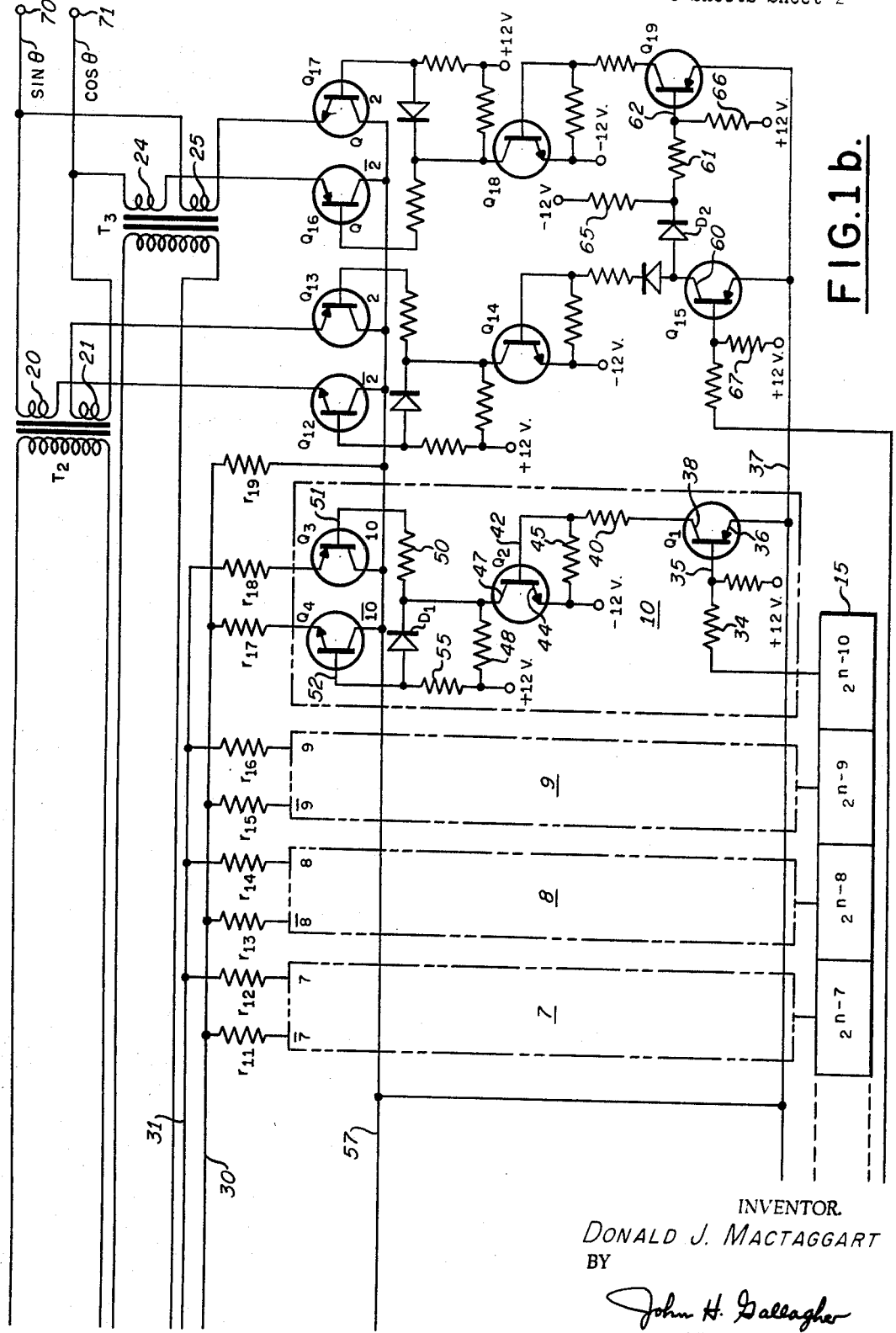
Figure 2:
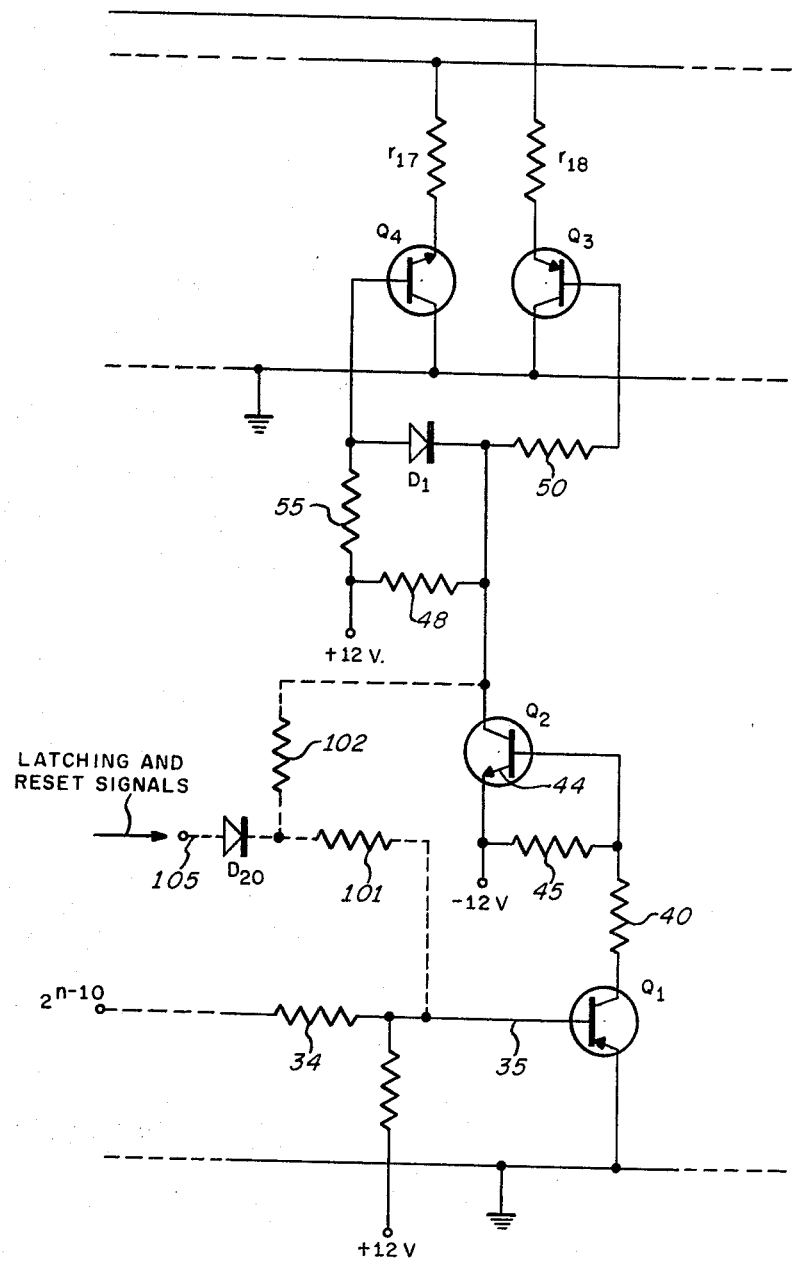

The present invention will be described by referring to the accompanying drawings wherein:

FIGS. 1a, 1b are simplified circuit diagrams of a solid state digital-to-resolver converter constructed in accordance with the present invention; and FIG. 2 is a diagram of a circuit that adds a "latching" feature to the switching circuits illustrated in FIG. 1.

Referring now in detail to FIGS. 1a, 1b of the drawings, the apparatus receives two input signals, one being a digital signal which is coded to represent an angle and which is obtained from a digital input signal source 15, and the other being an A.C. reference voltage that is applied to the primary winding 16 of transformer $T_1$ and from which the sine and cosine analog output voltages are synthesized. For purposes of the present discussion it will be assumed that the digitally coded signals from digital signal source 15 are ten bit digital words that are coded in the binary notation wherein the bit designated $2^{n-1}$ is the most significant bit and the bit designated $2^{n-10}$ is the least significant bit, $n$ being the total number of bits in a coded word. Although a ten bit word is used in this example, it will be understood that this is in no way a requirement of the present invention and it will function similarly for digital words having more or less bits. Furthermore, the digital words may be in notations other than binary without departing from the present invention.

As is well understood in the art, angles may be digitized into binary form by employing the following relationship:

quantized angle or arc segment = $306°/2^n$

In the ten bit digital input words assumed in this example, a complete 360° circle may be quantized into 1024 points, each .3515°, or 21.1' apart, and the central angle at any particular point is equal to .3515° multiplied by the decimal equivalent of the binary number. In the binary notation of a digitized number a 0 or 1 in the most significant digit position indicates respectively, that the coded angle is less than, or equal to or greater than 180°, and a 0 or 1 in the second most significant digit position indicates, respectively, that the coded angle is in the first and third, or second and fourth quadrants of the circle. It further is well understood that the sine and cosine functions each attain their maximum and minimum values in each quadrant, and whether the value of the particular function is increasing or decreasing depends upon the quadrant in which the quantized angle lies and upon whether the value of the angle is increasing or decreasing. Consequently, the following conventional trigometric identities are customarily employed in digital-to-resolver converters of this type.

$$\sin(180°+\theta) = -\sin\theta$$
$$\cos(180°+\theta) = -\cos\theta$$
$$\sin(90°+\theta) = +\cos\theta$$
$$\cos(90°+\theta) = -\sin\theta$$

where $\theta$ is a first quadrant angle.

As a consequence of these identities, the $n-2$ least significant digit positions of a digitally coded angle may be utilized to derive an analog signal representing the angle $\theta$ of the above trigometric identities and the first two most significant digit positions may be utilized to switch between the sine and cosine output terminals and to switch the phases of the analog output signals so as to realize the identities for angles greater than 90°.

Considering now the A.C. reference input voltage, which is assumed to be a 115 volt 400 cycle signal, a signal corresponding to this input voltage, but of reduced magnitude, is taken from the portion $c-b$ or $c-d$ of the secondary winding of transformer $T_1$. The particular portion of the secondary winding that is operative serves to determine the phase of the A.C. signal on lead $i$, and the correct phase is selected in response to the value of the binary signal in the most significant bit position $2^{n-1}$ of the digitally coded input signal, as will be explained in more detail hereinafter.

The A.C. reference voltage on lead $i$ is coupled to one end of each of the equal-valued parallel-connected output resistors $r_1$ and $r_2$. A first output transformer $T_3$ is connected across output resistor $r_1$ and a second output transformer $T_2$ is connected across output resistor $r_2$. Each output transformer $T_2$ and $T_3$ has two secondary windings 20, 21 and 24, 25 respectively, and depending on the value of the binary signal in the second most significant digit position $2^{n-2}$ of the digital input signal, one of the secondary windings 20 or 25 is connected to the sin $\theta$ output terminal 70 and one of the secondary windings 21 or 24 is connected to the cos $\theta$ output terminal 71. It will be seen that the signals from the secondary windings 20 and 21 of output transformer $T_2$ will be of opposite phase, while the signals from the secondary windings 24 and 25 of output transformer $T_3$ will be of like phase, these possible phasings being available to enable the realization of the above trigometric identities.

Connected to the bottom terminals of output resistors $r_1$ and $r_2$, and respectively in series therewith, are the resistive ladder networks 30 and 31, network 30 being comprised of the resistors having the odd numbered subscripts $r_3$, $r_5$ . . . $r_{19}$ and the network 31 being comprised of the resistors having the even numbered subscripts $r_4$, $r_6$ . . . $r_{18}$. Adjacent resistors such as $r_3$–$r_4$, $r_5$–$r_6$, $r_7$–$r_8$ . . . $r_{17}$–$r_{18}$ are associated pairs wherein the resistors of each pair are of equal values and the conductance values of the successively higher numbered pairs are proportioned in accordance with the weights of the $n-2$ least significant bits of the digital coded input signal. That is, the conductance values of the successive pairs of resistors are related to each other in accordance with powers of two in order to assure weighting in accordance with the binary notation of the digitally coded input signal. As an example, resistors $r_3$ and $r_4$ have conductance values equal to $\frac{1}{400}$ mho, resistors $r_5$ and $r_6$ have conductance values equal to $\frac{1}{800}$ mho and so on until the last resistors $r_{17}$, $r_{18}$, and $r_{19}$ have conductance values of $\frac{1}{51,200}$ mho. The resistors of the networks 30 and 31 are switched into or out of the respective networks by means of switching circuits which are enclosed within the blocks that are designated by the broken lines. In operation, the individual switching circuits are under control of the corresponding bit position signals of the digitally coded input signal from source 15. The switching circuits function to connect one resistor of a pair of equal valued resistors into its respective network and to disconnect the other resistor of that pair from its respective network, depending upon whether the corresponding digital bit signal is a 0 or a 1. Thus, a conductance value that is added to one of the resistor networks is simultaneously subtracted from the other resistor network. As is disclosed in the above Patent 3,325,805, accurate analog sine and cosine voltages may be generated in this manner.

Switching circuits for switching the conductance values of resistors $r_3$ through $r_{18}$ into and out of the respective networks 30 and 31 will be described by using as an example the circuitry within the block designated by the numeral 10. The switching circuits within blocks designated by the numerals 4 through 9 are substantially identical to the circuit shown in detail in block 10 and have not been shown in detail for purposes of simplifying the drawing and description. Referring now in detail to the block designated by the numeral 10, the switching signal is obtained from the least significant bit position $2^{n-10}$ of digital signal source 15. When that bit position signal is a binary zero, its output is approximately at ground potential, and when it is a binary one the output is at a negative potential. The signal from said least significant bit position is coupled through a resistor 34 to the base 35 of transistor $Q_1$ which is a pnp transistor connected in the grounded emitter configuration. Emitter 36 of transistor $Q_1$ is directly connected to a common ground bus 37 and its collector electrode 38 is connected through resistor 40 to the base 42 of transistor $Q_2$ which is an npn transistor whose emitter 44 is directly connected to a −12 volt supply. Resistor 45 is connected between the base 42 and emitter 44 of transistor $Q_2$. The collector 47 of transistor $Q_2$ is connected to one terminal of resistor 48 and to the junction point between diode $D_1$ and resistor 50. The other terminal of resistor 50 is coupled to the base 51 of transistor $Q_3$, while the anode of diode $D_1$ is connected to the base 52 of transistor $Q_4$. A +12 volt potential also is coupled to base 52 of transistor $Q_4$ through the resistor 55. Transistor $Q_3$ is a pnp transistor connected in the inverted configuration, that is, with its collector grounded to the common ground bus 57. Transistor $Q_4$ is a npn transistor that similarly is connected in the inverted configuration with its collector electrode directly connected to ground bus 57. Transistors $Q_4$ and $Q_3$ are respectively connected to the bottom terminals of network resistors $r_{17}$ and $r_{18}$ and together they function to connect one or the other of resistors $r_{17}$ or $r_{18}$ into their respective networks by completing a connection to ground bus 57. All transistors operate only between their non-conducting states and their fully conducting saturation states.

In describing the operation of the switching circuit designated by the numeral 10, it first will be assumed that the signal in the least significant bit position $2^{n-10}$ is a binary zero, which is a signal at or near ground potential. With this input applied to transistor $Q_1$ the +12 volt potential applied to base 35 will hold transistor $Q_1$ in its non-conducting state, and similarly, transistor $Q_2$ also will be in a non-conducting state since its base 42 will be at a −12 volt potential by way of resistor 45. The +12 volt potential applied through resistor 55 to base 52 of transistor $Q_4$ will cause that transistor to conduct in its saturation condition, and the same potential applied by way of resistors 48 and 50 to base 51 of transistor $Q_3$ will hold that transistor in the non-conducting state. Thus, network resistor $r_{17}$ is connected in the resistance network 30 while the network resistor $r_{18}$ is not connected in its respective network 31.

Assuming now that the signal in the least significant bit position $2^{n-10}$ is a binary one, which is a negative potential, transistor $Q_1$ will be rendered conducting to its saturation condition. The conduction of transistor $Q_1$ effectively connects the base 42 of transistor $Q_2$ to the ground bus 37 thus causing transistor $Q_2$ to conduct and thereby providing a direct connection from its collector 47 to the −12 volt supply that is connected to its emitter 44. This −12 volt potential appears at the cathode terminal of diode $D_1$ causing that diode to conduct, thereby applying the −12 volt supply to the base 52 of transistor $Q_4$, thus causing that transistor to cease conduction. This same −12 volt potential is applied through transistor $Q_2$ and resistor 50 to the base 51 of transistor $Q_3$ and causes that transistor to conduct and to connect the bottom terminal of network resistor $r_{18}$ to ground bus 57. It now may be seen that a binary zero in the least significant bit position $2^{n-10}$ connects network resistor $r_{17}$ into its respective network and causes the corresponding resistor $r_{18}$ to be disconnected from its respective resistor network. A binary one in the least significant bit position causes the switching circuit to reverse the connections of the network resistors $r_{17}$ and $r_{18}$ so that a conductance value is subtracted from the resistor network 30 and the same conductance value then is added to the resistor network 31. The switching networks within the box designated by the numerals 4 through 9 operate in the identical manner to switch their network resistors into or out of the resistor networks 30 and 31, it being kept in mind that the various pairs of network resistors associated with the switching networks present conductance values that are weighted according to the value of the bit position whose signal actuates their respective switching networks.

The switching circuit associated with network resistors $r_3$ and $r_4$ are substantially the same as the switching circuit just described with the exception that parallel transistors are employed to switch the network resistors to the common ground bus 57. Parallel transistors $Q_5$, $Q_6$, $Q_7$ and $Q_8$ are used in switching resistors $r_3$ and $r_4$ to ground in order to minimize the voltage drop across the switching transistors so as not to adversely affect the weighting of network resistors $r_3$ and $r_4$ inasmuch as these resistors have the smallest resistance values of any resistors in the networks 30 and 31. The structure and operation of the switching circuit designated by the numeral 3 is basically the same as the switching circuit previously described and for this reason its operation will not be further described. The only slight difference is that two of the above-described switching circuits are operated in parallel by virtue of the connection between transistors $Q_9$ and $Q_{10}$.

As to the overall operation of the resistor networks 30 and 31 to switch conductance values into and out of respective networks so as to generate the analog sine and cosine output voltages which are taken off at output resistors $r_1$ and $r_2$, it first will be assumed that the signals of bit positions $2^{n-3}$ through $2^{n-10}$ all are binary zeros, i.e., the digitally coded angle is 0°. In such a situation all of the odd numbered network resistors $r_3$, $r_5$, $r_7$ ... $r_{17}$, and the permanently connected network resistor $r_{19}$, are connected directly to ground and thus are connected in the network 30. On the other hand, all of the even numbered network resistors $r_4$, $r_6$, $r_8$ ... $r_{18}$ are open circuited and thus are not connected in their respective network 31. Therefore, the resistance network 30 presents a maximum conductance value, and being in series with output resistor $r_1$, causes a maximum voltage drop to be generated across output resistor $r_1$, this maximum voltage drop being defined as the unity value positive signal for the analog cosine $\theta$ output signal (cosine 0°=1). Since all of the even numbered network resistors are open circuited there is no conduction path to ground for output resistor $r_2$ and zero voltage drop appears across this output resistor. This then corresponds to the analog sine $\theta$ output signal (sin 0°=0).

To further demonstrate the operation of the resistor networks 30 and 31, it now will be assumed that the signals of the bit positions $2^{n-3}$ through $2^{n-10}$ all are binary ones, this representing an angle that is less than 90° by a value corresponding to the angular equivalent of the binary value of the least significant bit position $2^{n-10}$. In this case the odd numbered network resistors $r_3$, $r_5$, $r_7$ ... $r_{17}$ are open circuited and only the permanently grounded network resistor $r_{19}$ is in resistor network 30. All of the even numbered network resistors $r_4$, $r_6$, $r_8$ ... $r_{18}$ are grounded by the switching circuits and thus are connected in their resistor network 31. In this situation maximum voltage drop will appear across output resistor $r_2$, and a minimum voltage drop determined by resistor $r_{19}$ appears across output resistor $r_1$. These voltages correspond to those that are necessary to produce the sine and cosine functions for an angle that is less than 90° by the equivalent angular value of the least significant bit position. This example also indicates the necessity for the permanently grounded resistor $r_{19}$ in the resistor network 30, because without its presence the situation just described would have produced analog voltages corresponding to 90°, which would be in error inasmuch as it is assumed that the second most significant bit signal $2^{n-2}$ has not yet changed from a zero to a one. Analog sine and cosine output signals for angles less than 90° and greater than 0° are generated in a similar manner in response to digital bit signals that switch various combinations of network resistors (conductance values) into or out of their respective networks.

Having now discussed the generation of the analog sine and cosine output voltages for digitally coded signals from 0° up to but not including 90°, the operation of the device to produce analog sine and cosine voltages for digitally coded angles from 90° through 180° now will be discussed. The switching functions necessary to realize the above-recited trigometric identities for angles within this range are accomplished by switching between the various secondary windings of the transformers $T_2$ and $T_3$, these switching functions being controlled by the binary signal in the second most significant bit position $2^{n-2}$ of the digital input signal from source 15.

The switching of the secondary windings 20 and 21 of transformer $T_2$ is controlled by a switching circuit that includes transistors $Q_{12}$, $Q_{13}$, $Q_{14}$ and $Q_{15}$, and the secondary windings 24 and 25 of transformer $T_3$ are controlled by the switching circuit that includes transistors $Q_{16}$, $Q_{17}$, $Q_{18}$ and $Q_{19}$. Each of the respective switching circuits associated with a pair of secondary windings are substantially identical to the switching circuit that is designated by the numeral 10 and which has been previously described, the only exception being that the two switching circuits associated with the transformer secondaries operate in parallel in response to the bit signals from the second most significant bit position $2^{n-2}$. Describing now only the parallel connection and operation of the transformer switching circuits it will be seen that the collector 60 of transistor $Q_{15}$ is coupled through diode $D_2$ and resistor 61 to the base 62 of transistor $Q_{19}$. Resistor 65 connects a $-12$ volt biasing source to the junction between diode $D_2$ and resistor 61. A $+12$ volt biasing source is connected through resistor 66 to base 62 of transistor $Q_{19}$. Resistor 66 has a value that is larger than the total series resistance value of resistors 61 and 65 for reasons which will become apparent. When the signal of the second most significant bit position $2^{n-2}$ is a binary zero, transistor $Q_{15}$ is nonconducting by virtue of the $+12$ volt bias applied through resistor 67. Diode $D_2$ is nonconducting so that a conduction path exists between the $+12$ volt biasing source coupled through resistor 66, resistor 61, and resistor 65 to the $-12$ volt biasing source. Because resistor 66 is larger than the total series resistance of both resistors 61 and 65, the base 62 of transistor $Q_{19}$ will be at a negative potential to cause transistor $Q_{19}$ to conduct in its saturation condition. With the conditions existing as just described, transistors $Q_{12}$ and $Q_{16}$ will be conducting so as to effectively connect in circuit the secondary winding 20 of transformer $T_2$ and the secondary winding 24 of transformer $T_3$. The signal on the output terminal 70, which is connected to the secondary winding 20 of transformer $T_2$, is an analog signal representing the sine of the digitally coded angle for angles in the first quadrant of a circle, and the signal appearing at output terminal 71, which is coupled from secondary winding 24 of transformer $T_3$, is an analog signal representing the cosine of the digitally coded angle for angles in the first quadrant.

When the bit value of the second most significant bit position changes to a binary one, which indicates that the digitally coded angle is in the second or fourth quadrants, the signal applied to the base of transistor $Q_{15}$ is a negative signal which causes transistor $Q_{15}$ to conduct, and as in the operation of the previously explained switching circuit, causes transistor $Q_{12}$ to cease conduction and causes transistor $Q_{13}$ to conduct to saturation, thus disconnecting secondary winding 20 of transformer $T_2$ and connecting into circuit the secondary winding 21 of that transformer. When transistor $Q_{15}$ conducts, the $-12$ volt biasing source that is connected to the upper terminal of resistor 65 now is connected to ground through transistor $Q_{15}$ and transistor $Q_{19}$ is rendered non-conducting so that the conduction states of transistors $Q_{16}$ and $Q_{17}$ now are reversed, which has the effect of disconnecting secondary winding 24 of transformer $T_3$ and connecting in circuit the secondary winding 25 of that transformer. It may be seen that secondary winding 21 of transformer $T_2$ is connected to output terminal 71 and the polarity of the signal on secondary winding 21 is reversed with respect to the signal that was coupled from secondary winding 20. This switching operation of the secondaries of transformer $T_2$ thus achieves the trigometric identity $\cos(90°+\theta) = -\sin\theta$. The switching operation of the secondaries of transformer $T_3$ disconnects secondary winding 24 and connects into the circuit secondary winding 25. This changes the secondary connection of transformer $T_3$ from output terminal 71 to output terminal 70, and in this instance the signals from secondary winding 25 are of the same phase as were the signals from secondary winding 24. This switching operation of transformer $T_3$ then achieves the trigometric identity sin $$(90°+\theta) = +\cos\theta$$

It will be recalled that for digitally coded signals which represent angles from 180° up to but not including 360°, the sine and cosine analog output voltages must be switched to realize the following trigometric identities:

$$\sin(180°+\theta) = -\sin\theta$$
$$\cos(180°+\theta) = -\cos\theta$$

This change of sign is accomplished in the present device by reversing the phase of the A.C. signal on line $i$ that is applied to the top terminals of output resistor $r_1$ and $r_2$. The reversal of phase is accomplished at the secondary windings of input transformer $T_1$. The phase for angles from 0° up to but not including 180° is taken from the secondary winding $c$–$d$, and for angles from 180° up to but not including 360° the opposite phase is taken from winding $c$–$b$. The switching operation for accomplishing the reversal of phase of the A.C. signal supplied to line $i$ is provided by the switching circuit designated by the numeral 1. This circuit may be substantially the same type of circuit that was previously described for the switching circuit within the block designated by the numeral 10. The switching circuit designated by the numeral 1 operates in response to the bit signal from the most significant bit position $2^{n-1}$ that is supplied from the digital input source 15.

By providing in each of the resistance networks 30 and 31 a separate network resistor corresponding to a digital position, each resistor may have a respective switching transistor which is connected directly to the stable and unchanging reference of ground potential. Any switching transients that may be generated during the switching operation are minimized inasmuch as there are no high impedance circuit components through which they must flow to ground. This helps insure reliable operation of the switching circuits by minimizing erroneous triggering of the transistor switches due to switching transients. In order for accurate sine and cosine analog voltages to be generated with the use of weighted resistor networks, the switching means which switch the resistors into and out of the respective networks must have high off-to-on impedance ratios. It is known that in the "inverted" transistor configuration the voltage drop across a conducting transistor is minimum and also the leakage current through an off transistor is minimum, for transistors made from germanium semiconductor materials. The circuit configuration of the resistor networks of this invention, wherein a separate resistor of a given weight is employed in each resistor network and wherein the switching transistor for each resistor of a given weight is connected directly to ground, is ideally suited for employment of the inverted transistor configuration. I have found that only by employing this inverted transistor configuration has it been possible to generate sine and cosine voltage waveforms having sufficient accuracy to meet requirements of a commercially acceptable device.

In the above example of the coded input signal, binary ones in the most significant digit position and in the second most significant digit position correspond respectively to angles 180° and 90°. In some codings it may be that the most significant digit position may not represent the 180° bit, but may have a significance that is not related to the magnitude of the coded angle. It therefore should be understood that in the above discussion and in the following claims the use of the phrase "most significant digit, or bit, position" refers to the bit position of most significance in terms of the coded magnitude of the angle.

A useful feature that is easily incorporated into the design of the converter of FIG. 1 is the "latching" feature that is provided by the circuitry that is illustrated in FIG. 2. This features is useful when the converter of FIG. 1 is used in a mode of operation in which the input digital information from source 15 is not continuously available but must be time shared with other apparatus, yet it is desirable that the converter of FIG. 1 provide continuous analog output signals corresponding to the most recently received digital input information. The circuitry of FIG. 2 includes the previously described switching circuitry within the block designated by the numeral 10 of FIG. 1. It should be understood that the circuitry in FIG. 2 that provides the "latching" feature also will be included in each of the switching circuits of FIG. 1, but for simplicity of illustration and description only one circuit will be described.

In FIG. 2 the circuitry that is added to the previously described switching circuitry includes the diode $D_{20}$ and the resistors 101 and 102 which are connected into the switching circuitry by the leads that are illustrated by the broken lines. Signals which command the circuitry to function in a latching mode of operation and which reset the switching circuitry to its 0 input condition are coupled in on line 105 at the anode terminal at diode $D_{20}$. A latching signal is assumed to be a binary one that is at a negative potential, and a reset signal is assumed to be a binary zero that is at or near ground potential. Assuming first that a latching signal is present at the anode of diode $D_{20}$ the diode will be back-biased so as to be in the non-conduction state. Further assuming that the digital signal in the least significant bit position $2^{-10}$ is a binary zero, transistors $Q_1$ and $Q_2$ both will be non-conducting. When the least significant bit signal $2^{n-10}$ is a binary zero, transistor $Q_4$ will be conducting to connect network resistor $r_{17}$ to ground and transistor $Q_3$ will be non-conducting so as to open circuit the connection to network resistor $r_{18}$. Because diode $D_{20}$ and transistor $Q_2$ both are non-conducting there is no conduction path through resistors 101 and 102 and the switching circuit will remain in the condition just described. Assuming now that the signal from the least significant bit position $2^{n-10}$ is a binary one, i.e., a negative potential signal, transistor $Q_1$ conducts, and by virtue of the current through resistor 40, transistor $Q_2$ also is rendered conducting. The $-12$ volt potential that is coupled from the emitter to the collector of transistor $Q_2$ causes transistor $Q_4$ to cut off and causes transistor $Q_3$ to commence conducting, thereby reversing the connections of the network resistors $r_{17}$ and $r_{18}$. By virtue of the conduction of transistor $Q_2$ a conduction path now exists from the base 35 of transistor $Q_1$, through resistors $r_{101}$, $r_{102}$, through the transistor $Q_2$ to the $-12$ volt supply that is connected to emitter electrode 44 of transistor $Q_2$. This conduction path just described establishes a potential at base 35 of transistor $Q_1$ which will maintain this transistor in a conduction state even should the negative signal from the $2^{n-10}$ stage be removed. The circuit will remain in this condition so long as the negative potential latching signal is present on line 105.

The operating condition of the circuit of FIG. 2 is reset to its 0 input condition by applying a reset signal at or near ground potential to the line 105. The reset signal tends to forward-bias the diode $D_{20}$, thus grounding the junction point between resistors 101 and 102. Should transistors $Q_1$ and $Q_2$ be non-conducting, the presence of the reset signal will have no effect on the condition of the circuit. In the event that transistors $Q_1$ and $Q_2$ are conducting, the grounding of the junction point between resistors 101 and 102 raises the potential on base 35 of transistor $Q_1$ and thus causes that transistor to cut off. Transistor $Q_2$ similarly will be cut off and the network resistors $r_{17}$ and $r_{18}$ will have their connections to ground reversed.

It thus is seen that means now are provided for holding the conduction state of the switching network in either one of its two operating conditions even though no digital signal is applied from the least significant bit position $2^{-10}$.

What is claimed is:
1. Apparatus comprising,
   first and second output impedances,
   means for coupling a reference signal to a first terminal of each of said impedances,
   a first plurality of weighted impedances each having one terminal connected to a second terminal of said first output impedance and a second plurality of impedances that are weighted similarly to said plurality and each having one terminal connected to a second terminal of said second output impedance,
   first and second pluralities of switching transistors each having a base, an emitter, and a collector,
   said transistors being associated in pairs and the emitters of the transistors of a pair being respectively connected to the second terminals of similarly weighted impedances of the two pluralities of weighted impedances,
   a common grounding means connected to the collector of each one of said transistors,
   a source of digital input signals for providing digital words having $n$ bits,
   a plurality of means each operable in response to one of the $n-2$ least significant bit signals of the digital input signal and each being connected to the bases of a respective pair of switching transistors to control the conduction states of the pair of transistors, said last-named means operating to cause one of the transistors of a pair to conduct to saturation and the other transistor of that pair to be cut off when the respective bit signal is of one value and to reverse the conduction states of the pair of transistors when the respective bit signal is a different value.

2. The combination claimed in claim 1 and further including
   first and second output transformers respectively connected across said first and second output impedances,
   first and second secondary windings associated with said first output transformer and third and fourth secondary windings associated with said second output transformer, each one of said secondary windings having two terminals,
   first and second device output terminals,
   the first terminal of said first secondary winding and the second terminal of said second secondary winding being respectively coupled to said first and second device output terminals and the first terminals of said third and fourth secondary windings being respectively coupled to said second and first device output terminals,
   means operating in response to the second most significant bit signal of said digital input signal to connect only said first and third secondary windings to said common ground means when said second most significant bit is of one value and to connect only said second and fourth secondary windings to said common ground when said second most significant bit is of a different value.

3. The combination claimed in claim 2 and further including,
   an input transformer having a secondary winding with first and second end terminals and a common terminal connected to the central region of said secondary winding, means for connecting the first terminals of said output impedances in parallel with said common terminal of the input transformer, means operable in response to the most significant bit signal of the digital input signal for connecting only the first one of said end terminals to said common ground means when said most significant bit signal is of one value and for connecting only the second one of said end terminals to said common ground means when said most significant bit signal is of a different value.

References Cited

UNITED STATES PATENTS

| | | | |
|---|---|---|---|
| 3,134,098 | 5/1964 | Herzl | 340—347 |
| 3,201,778 | 8/1965 | Porter et al. | 340—347 |
| 3,225,345 | 12/1965 | Absatz et al. | 340—347 |
| 3,225,805 | 6/1967 | Dorey | 340—347 |

MAYNARD R. WILBUR, Primary Examiner

JEREMIAH GLASSMAN, Assistant Examiner